United States Patent Office.

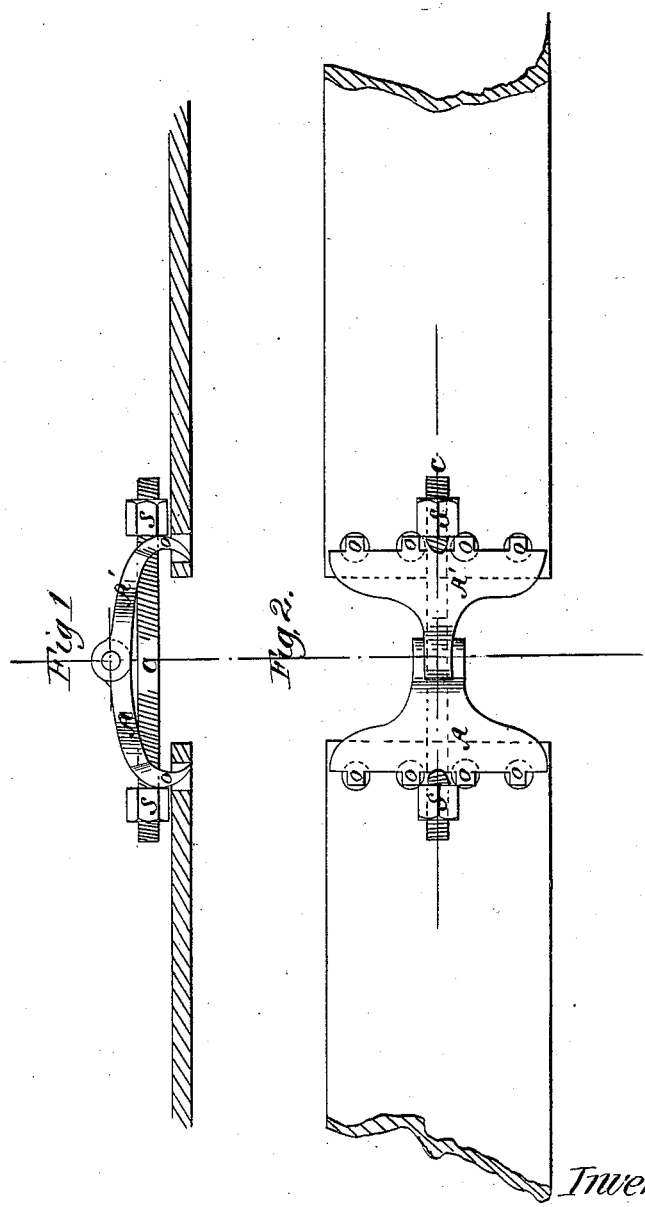

C. W. THEODORE KRAUSCH, OF PHILADELPHIA, PENNSYLVANIA.

Letters Patent No. 77,295, dated April 28, 1868; antedated April 21, 1868.

IMPROVEMENT IN BELT-COUPLING.

The Schedule referred to in these Letters Patent and making part of the same.

TO ALL WHOM IT MAY CONCERN:

Be it known that I, C. W. THEODORE KRAUSCH, of Philadelphia, in the county of Philadelphia, in the State of Pennsylvania, have invented a new and improved Mode of Effecting the Coupling and Tightening of Belts or Bands; and I do hereby declare that the following is a full and exact description thereof, reference being had to the accompanying drawings, and to the letters of reference marked thereon, making a part of this specification, in which—

Figure I is a side elevation of my combined belt-coupling and tightener, and

Figure II a top view of it.

The object of my invention is to effect the coupling of belts or bands, as well as the adjusting of the degree of tightness of belts or bands, by one and the same arrangement or machine.

To enable others skilled in the art to understand my invention, I will describe its construction and operation.

The inclined wings A A' are connected at their narrow end by means of pin P, forming together a hinge. The opposite ends of the wings A A' are provided with hooks $o$ $o$ $o$ $o$. A screw, C, passes through the wings A A', the latter having (each of them) an opening, $x$, for screw C to pass through. At each end of screw C a nut, S, is placed.

Having described its construction, I shall now describe its operation.

The belt has been cut, also holes punched through it in corresponding distances with the hooks $o$ $o$ $o$ $o$ of wings A A'. Screw C rests in the openings $x$ $x$, which are seen in wings A A', and is to be so placed as to project sufficiently over the wings A A' for the action of the nuts S S'. Now spread wings A A' as far apart as screw C may allow; then place or fasten the belt-ends to the hooks $o$ $o$ $o$ $o$, and put the belt over the pulleys. If found, the belt being slack or better to slack for the work to be done by the belt; then turn the nut or nuts S S toward the wings A A', which will cause the wings A A' to come nearer together with their hook-ends, thereby effecting the tightening of the belt.

In case wide belts or bands are used, then I place or fasten a corresponding number of the combined coupling and tightener beside each other. In doing so, I am enabled to tighten one or the other side of the belt or the centre part of it, which has not been done yet by any tightening-device in use.

The advantages arising of this invention are clearly seen.

Having thus described my invention, what I claim as new, and desire to secure by Letters Patent, is—

1. An adjustable belt or band-clasp, (coupling,) by means of which also the degree of tightness of a belt or band can be effected.

2. A belt-clasp, combined with belt-tightener, substantially in the manner as and for the purpose set forth.

C. W. THEODORE KRAUSCH.

Witnesses:
THOMAS McGAURAN,
EUGENE SMITH.